US008810632B2

(12) United States Patent
Hwang et al.

(10) Patent No.: US 8,810,632 B2
(45) Date of Patent: Aug. 19, 2014

(54) APPARATUS AND METHOD FOR GENERATING A THREE-DIMENSIONAL IMAGE USING A COLLABORATIVE PHOTOGRAPHY GROUP

(75) Inventors: Chan Soo Hwang, Yongin-si (KR); Yoon Chae Cheong, Seongnam-si (KR); Do Kyoon Kim, Seongnam-si (KR); Kee Chang Lee, Yongin-si (KR); Ouk Choi, Yongin-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 403 days.

(21) Appl. No.: 12/896,499

(22) Filed: Oct. 1, 2010

(65) Prior Publication Data
US 2011/0109726 A1    May 12, 2011

(30) Foreign Application Priority Data

Nov. 9, 2009   (KR) .......................... 10-2009-0107389

(51) Int. Cl.
*H04N 13/02*  (2006.01)
*H04N 5/232*  (2006.01)
*H04N 7/18*   (2006.01)
*G06F 17/30*  (2006.01)

(52) U.S. Cl.
CPC ........... *H04N 5/23203* (2013.01); *H04N 7/181* (2013.01); *G06F 17/30058* (2013.01)
USPC ........................................................ 348/47

(58) Field of Classification Search
USPC ..................................................... 348/0.047
See application file for complete search history.

(56) References Cited

U.S. PATENT DOCUMENTS

| | | | |
|---|---|---|---|
| 6,055,012 A * | 4/2000 | Haskell et al. | 348/48 |
| 7,106,361 B2 * | 9/2006 | Kanade et al. | 348/159 |
| 8,458,462 B1 * | 6/2013 | Hanna | 713/163 |
| 2002/0090143 A1 * | 7/2002 | Endo et al. | 382/282 |
| 2003/0076413 A1 * | 4/2003 | Kanade et al. | 348/139 |
| 2003/0133018 A1 * | 7/2003 | Ziemkowski | 348/211.2 |
| 2004/0162154 A1 * | 8/2004 | DeJohn | 473/266 |
| 2005/0078876 A1 * | 4/2005 | Zhang et al. | 382/240 |
| 2005/0185711 A1 * | 8/2005 | Pfister et al. | 375/240.01 |
| 2006/0023782 A1 * | 2/2006 | Cai et al. | 375/240.03 |
| 2006/0023787 A1 * | 2/2006 | Cai et al. | 375/240.16 |
| 2006/0024041 A1 * | 2/2006 | Lou et al. | 396/213 |
| 2006/0224301 A1 * | 10/2006 | Sakagami et al. | 701/200 |
| 2007/0160135 A1 * | 7/2007 | Ishikawa et al. | 375/240.01 |

(Continued)

FOREIGN PATENT DOCUMENTS

| | | |
|---|---|---|
| JP | 2002-027495 | 1/2002 |
| KR | 1020060006304 | 1/2006 |

(Continued)

OTHER PUBLICATIONS

Dubrofsky, Homography Estimation, Mar. 2009, The University of British Columbia, pp. 1-32.*

*Primary Examiner* — Sath V Perugavoor
*Assistant Examiner* — Peter D Le
(74) *Attorney, Agent, or Firm* — NSIP Law (57) ABSTRACT

A communication network comprising a collaborative photography group including a plurality of cameras having synchronized photographing times, is provided. The plurality of cameras may share location information, direction angle information, and image information generated by photographing an object, and generate a three-dimensional (3D) image of the object.

17 Claims, 8 Drawing Sheets

CAMERA 1

CAMERA 4

SUBJECT (VEHICLE)

CAMERA 2

CAMERA 3

(56) References Cited

U.S. PATENT DOCUMENTS

| | | |
|---|---|---|
| 2007/0195082 A1* | 8/2007 | Takanashi et al. ............ 345/419 |
| 2008/0095402 A1* | 4/2008 | Kochi et al. .................. 382/103 |
| 2008/0234935 A1* | 9/2008 | Wolf et al. ................... 701/216 |
| 2008/0309556 A1* | 12/2008 | Hohl ........................... 342/451 |
| 2009/0041293 A1* | 2/2009 | Andrew et al. ............... 382/100 |
| 2009/0091798 A1* | 4/2009 | Lawther et al. ............. 358/3.28 |
| 2010/0021072 A1* | 1/2010 | Shimizu et al. .............. 382/233 |
| 2010/0026712 A1* | 2/2010 | Aliprandi et al. ............ 345/629 |
| 2010/0153395 A1* | 6/2010 | Hannuksela et al. ......... 707/737 |
| 2010/0238264 A1* | 9/2010 | Liu et al. ................... 348/14.13 |
| 2010/0245372 A1* | 9/2010 | Gedik et al. ................. 345/581 |
| 2010/0328460 A1* | 12/2010 | Merkel et al. ................ 348/143 |
| 2010/0329358 A1* | 12/2010 | Zhang et al. ............. 375/240.26 |
| 2011/0050846 A1* | 3/2011 | Miceli ............................ 348/42 |
| 2011/0074926 A1* | 3/2011 | Khan et al. .................... 348/46 |
| 2011/0242276 A1* | 10/2011 | Holden et al. .................. 348/43 |
| 2011/0254837 A1* | 10/2011 | Kang et al. ................... 345/419 |
| 2012/0314040 A1* | 12/2012 | Kopf et al. ..................... 348/50 |

FOREIGN PATENT DOCUMENTS

| | | |
|---|---|---|
| KR | 100629442 | 9/2006 |
| KR | 1020070058263 | 6/2007 |
| KR | 1020080087256 | 10/2008 |

* cited by examiner

FIG. 1

CAMERA 1

CAMERA 4

SUBJECT (VEHICLE)

CAMERA 2

CAMERA 3

APPARATUS AND METHOD FOR GENERATING A THREE-DIMENSIONAL IMAGE USING A COLLABORATIVE PHOTOGRAPHY GROUP

CROSS-REFERENCE TO RELATED APPLICATION(S)

This application claims the benefit under 35 U.S.C. §119 (a) of Korean Patent Application No. 10-2009-0107389, filed on Nov. 9, 2009, in the Korean Intellectual Property Office, the entire disclosure of which is incorporated herein by reference for all purposes.

BACKGROUND

1. Field

The following description relates to a technology enabling a plurality of cameras to collaboratively photograph an object to obtain a three-dimensional (3D) image of the object.

2. Description of the Related Art

Currently, users are capable of taking video or still photographs using a camera installed in a mobile device such as a mobile phone.

When a single user photographs a three-dimensional (3D) object using a single camera, the 3D object may not be accurately represented in a 3D space because the view of the camera may be limited.

Examples of using a plurality of cameras to photograph a single subject may exist. For example, each member of a fan club of a singer may take a photo in the singer's concert using each member's camera, or students visiting a zoo may each take a photo of a particular animal using each camera. However, with this method, it is difficult to obtain images of the same object at the same time, and therefore, it may be difficult to accurately represent an object in 3D.

SUMMARY

In one general aspect, provided is a method of a target camera connected to a communication network, the method comprising synchronizing the time of one or more neighboring cameras and the target camera that are each included in a previously formed collaborative photography group, in order to synchronize photographing times of the neighbor camera and the target camera, collecting direction angle information and location information about the one or more neighboring cameras, collecting image information of the one or more neighboring cameras, which includes image information transmitted from the one or more neighboring cameras, and obtained when the one or more neighboring cameras photograph an object at the synchronized photographing time, processing the image information based on the direction angle information and the location information of the one or more neighboring cameras, and generating a three-dimensional (3D) image of the object based on the processed image information.

The synchronizing may include synchronizing the time of the target camera and an access point of the collaborative photography group, in order to synchronize the time of the one or more neighboring cameras and the target camera.

The method may further include photographing the object at the synchronized photographing time to generate image information of the target camera.

The processing the image information may further include processing the image information of the target camera based on direction angle information and location information of the target camera.

The collecting the direction angle information and the location information of the one or more neighboring cameras may include collecting the direction angle information and the location information of the one or more neighboring cameras using an ad hoc network.

The collecting of the direction angle information and the location information of the one or more neighboring cameras may include estimating the location information of the one or more neighboring cameras based on a signal received from the one or more neighboring cameras, respectively.

The collecting of the direction angle information and the location information of the one or more neighboring cameras may include collecting the direction angle of the one or more neighboring cameras using an accelerometer and a geomagnetic sensor that are installed in each of the one or more neighboring cameras.

The collected image information may be network-coded.

The access point may be any one of a plurality of cameras included in the collaborative photography group, or a base station of a cellular system.

The method may further include receiving a multicast group identifier (ID) of the collaborative photography group to enable a multicast scheme to be used to collect at least one of the location information, the direction angle information, and the image information of the one or more neighboring cameras.

In another aspect, there is provided a method of a target camera connected to a communication network, the method including synchronizing the time of one or more neighboring cameras and the target camera that are each included in a previously formed collaborative photography group, in order to synchronize photographing times of the neighbor camera and the target camera, collecting direction angle information and location information of the target camera, photographing a subject at the synchronized photographing time and generating image information of the target camera, and uploading the image information, the location information, and the direction angle information of the target camera to a predetermined server.

The method may further include receiving a three-dimensional (3D) image of the subject from the predetermined server.

In another aspect, there is provided a computer-readable storage medium having stored therein program instructions to cause a processor to implement a method of a target camera connected to a communication network, the method including synchronizing the time of one or more neighboring cameras and the target camera that are each included in a previously formed collaborative photography group, in order to synchronize photographing times of the neighbor camera and the target camera, collecting direction angle information and location information of the one or more neighboring cameras, collecting image information of the one or more neighboring cameras, which includes image information transmitted from the one or more neighboring cameras and obtained when the one or more neighboring cameras photograph an object at the synchronized photographing time, processing the image information based on the direction angle information and the location information of the neighbor camera, and generating a 3D image of the object.

In another aspect, there is provided a target camera connected to a communication network, the target camera including a time synchronization unit to synchronize the time of one or more neighboring cameras and the target camera that are each included in a previously formed collaborative photography group, in order to synchronize photographing times of the one or more neighboring cameras and the target camera, a location/direction angle information collection unit to collect direction angle information and location information of the one or more neighboring cameras, an image information collection unit to collect image information of the one or more neighboring cameras, which includes image information transmitted from the one or more neighboring cameras and obtained when the one or more neighboring cameras photograph an object at the synchronized photographing time, an image generation unit to process the image information based on the direction angle information and the location information of the one or more neighboring cameras, and to generate a 3D image of the object.

The target camera may further include a photography unit to photograph the object at the synchronized photographing time to generate image information of the target camera.

Other features and aspects may be apparent from the following description, the drawings, and the claims.

BRIEF DESCRIPTION OF THE DRAWINGS

Throughout the drawings and the description, unless otherwise described, the same drawing reference numerals should be understood to refer to the same elements, features, and structures. The relative size and depiction of these elements may be exaggerated for clarity, illustration, and convenience.

DETAILED DESCRIPTION

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. The progression of processing steps and/or operations described is an example; however, the sequence of steps and/or operations is not limited to that set forth herein and may be changed as is known in the art, with the exception of steps and/or operations necessarily occurring in a certain order. Also, descriptions of well-known functions and constructions may be omitted for increased clarity and conciseness.

As described herein, the term object may refer to a person, place, or thing, for example, a person, an animal, a setting, a physical object, a live object, or any other three-dimensional (3D) object that may be photographed.

Figure 1:
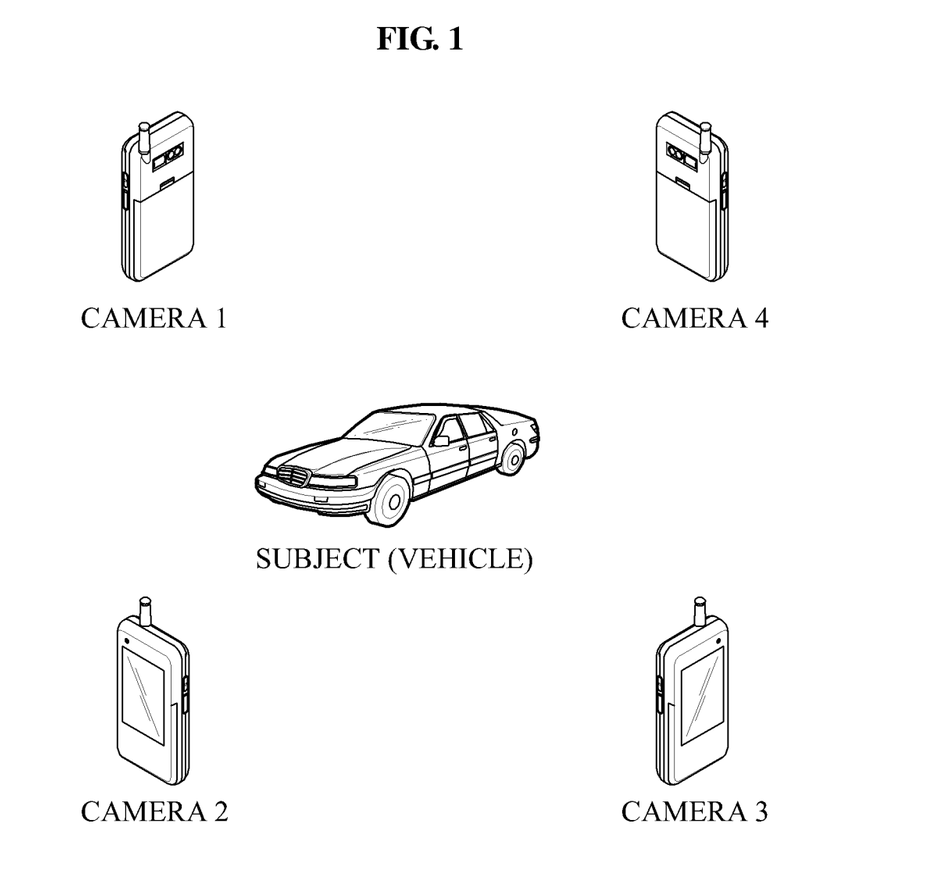
FIG. 1 is a diagram illustrating a plurality of cameras photographing an object.

FIG. 1 illustrates an example of a plurality of cameras photographing an object.

Referring to FIG. 1, a plurality of cameras (camera 1 through camera 4) may exist with respect to a single object. In this example, the object is a moving vehicle. For example, four users who are members of a predetermined group may photograph the object from different locations. A communication module may be installed in each of the cameras, or a mobile terminal such as a cellular phone, a notebook computer, and the like.

The plurality of cameras may photograph the subject from different locations and angles and thus, a three-dimensional (3D) image of the object may be generated. However, because the subject moves, or the background changes, the plurality of cameras should photograph the subject at a same photographing time to accurately represent the 3D image.

Accordingly, times of the plurality of cameras should be synchronized to enable the plurality of cameras to have the same photographing time. That is, the cameras may be synchronized to photograph an object at the same time. According to various embodiments, the plurality of cameras may configure a communication network between the cameras, for example, an ad hoc network, a cellular communication network, and the like. Thus, the photographing time of the plurality of cameras may have the same photographing time. Also, the plurality of cameras may share location information of the other cameras and direction angle information of other cameras with respect to an object.

Figure 2:
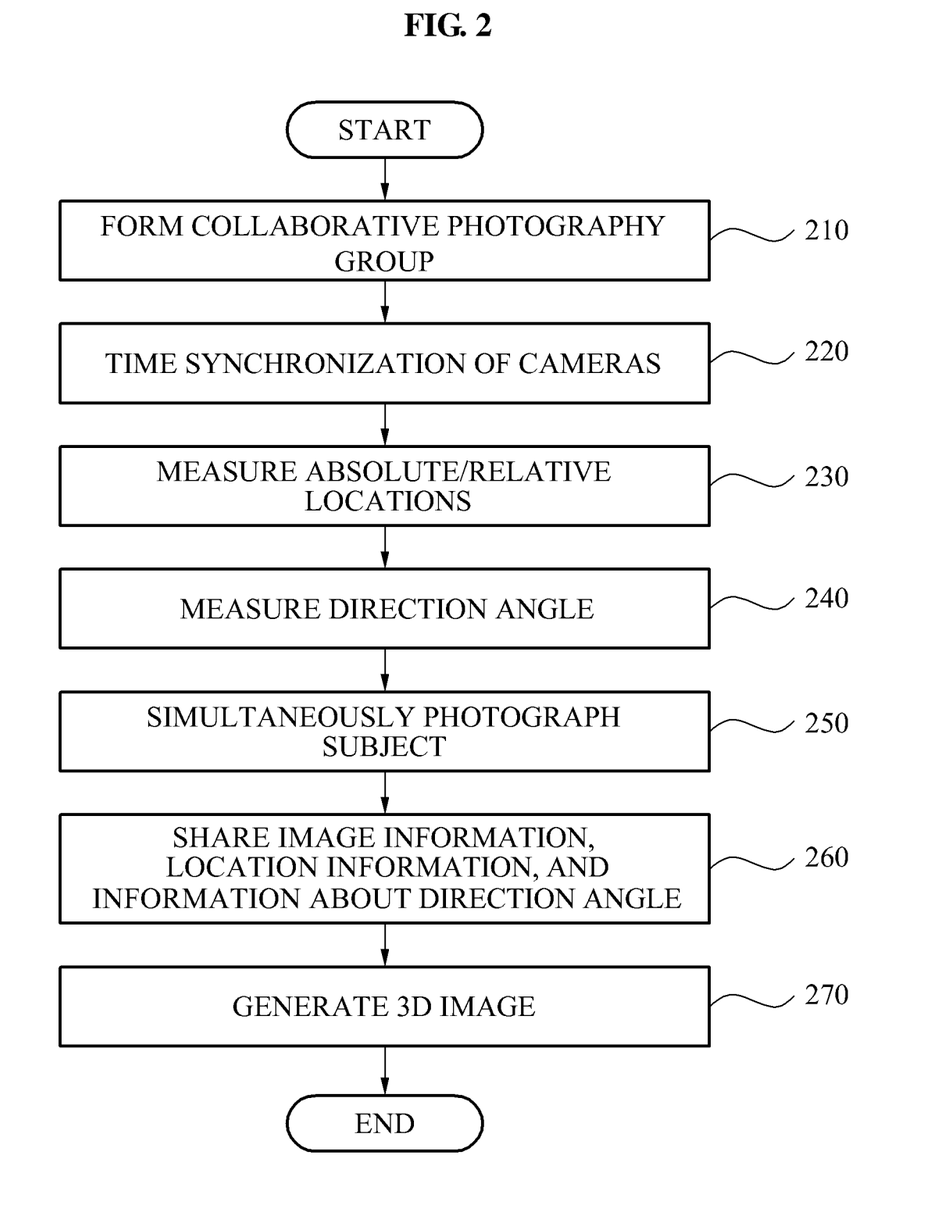
FIG. 2 is a flowchart illustrating an example of a method performed by one or more cameras from a plurality of cameras.

FIG. 2 illustrates an example of a method performed by a plurality of cameras.

Referring to FIG. 2, in operation 210, the plurality of cameras form a collaborative photography group. For example, cameras of users who are members of a predetermined club, or cameras of users who go to a zoo may form a collaborative photography group to photograph an object in collaboration with each other. It should be understood that these examples are merely mentioned for purposes of example.

The collaborative photography group may be formed in various ways. For example, the plurality of cameras may form the collaborative photography group by sharing an authentication key in advance or by being registered on an online website.

In operation 220, the plurality of cameras synchronize times to enable an object to be photographed at the same photographing time. Therefore, each of the cameras may photograph the object at the same photographing time and 3D modeling may be performed with respect to the object. A variety of time synchronization methods are further described with reference to FIG. 5.

In operation 230, each of the cameras measures an absolute/relative location of itself or an absolute/relative location of another camera. For example, the absolute location may be measured by a Global Positioning System (GPS), and the relative location may be measured by analyzing signals received destined for other cameras.

For example, in the example where there are four cameras, each of the four cameras may measure an absolute location of itself and an absolute location of the other three cameras using a GPS. Also, each of the cameras may sequentially transmit a well-known preamble. A predetermined camera may transmit the preamble at a predetermined point in time, and other cameras may estimate a distance between the predetermined camera and the other cameras based on, for example, the signal intensity of the received preamble, and the like.

Accordingly, relative locations of the predetermined camera and the other cameras may be estimated. In some embodiments, the distance and relative locations of the cameras may be estimated based on a Degree Of Arrival (DOA) of the received preamble. When at least two cameras simultaneously transmit a preamble, distances and relative locations of the cameras may be estimated based on a Difference of Time-Of-Arrival (DTOA).

In operation 240, each of the cameras measures a direction angle of each of the cameras, with respect to the object.

To perform 3D modeling, location information and direction angle information of each camera may be collected. Because images photographed by the cameras, may vary depending on a direction where each of the cameras faces, and the location of each camera, the location information and the direction angle information may be used to perform 3D modeling. For example, the direction angle information may be obtained by an accelerometer and/or a geometric sensor installed in each of the cameras.

In operation 250, when photographing is requested by any one of the cameras, or requested by a predetermined server, each of the cameras simultaneously photographs the object at a requested photographing time.

In operation 260, image information about an image photographed by each of the cameras, location information, and the direction angle information of each of the cameras may be shared with all the cameras of the group.

For example, each of the cameras may broadcast the image information, location information, and direction angle information to each of the other cameras among the group. Thus, each of the cameras may share the image information, location information, and direction angle information. The above-described information may be transmitted via a communication network. Also, the information may be network-coded and transmitted/received by the cameras.

In operation 270, each of the cameras performs 3D rendering to generate a 3D image after sharing the image information, location information, and direction angle information. That is, image information of the cameras may be photographed at various locations and views (direction angles) and shared. Thus, each of the cameras may generate the 3D image by processing the image information.

The flowchart of FIG. 2 is associated with an example where the cameras perform 3D rendering. However, in various embodiments, the 3D rendering may be performed by a server, such as a server of a mobile telecommunications provider or the 3D rendering may be performed by the camera itself. Also, the cameras may or may not configure a communication network between the cameras.

However, it should be understood that the 3D rendering may be performed using only the captured images of the camera. That is, the 3D rendering may be performed without using at least one of the location information or the camera angle information. Also, not all cameras may have location information and/or camera angle information.

Figure 3:
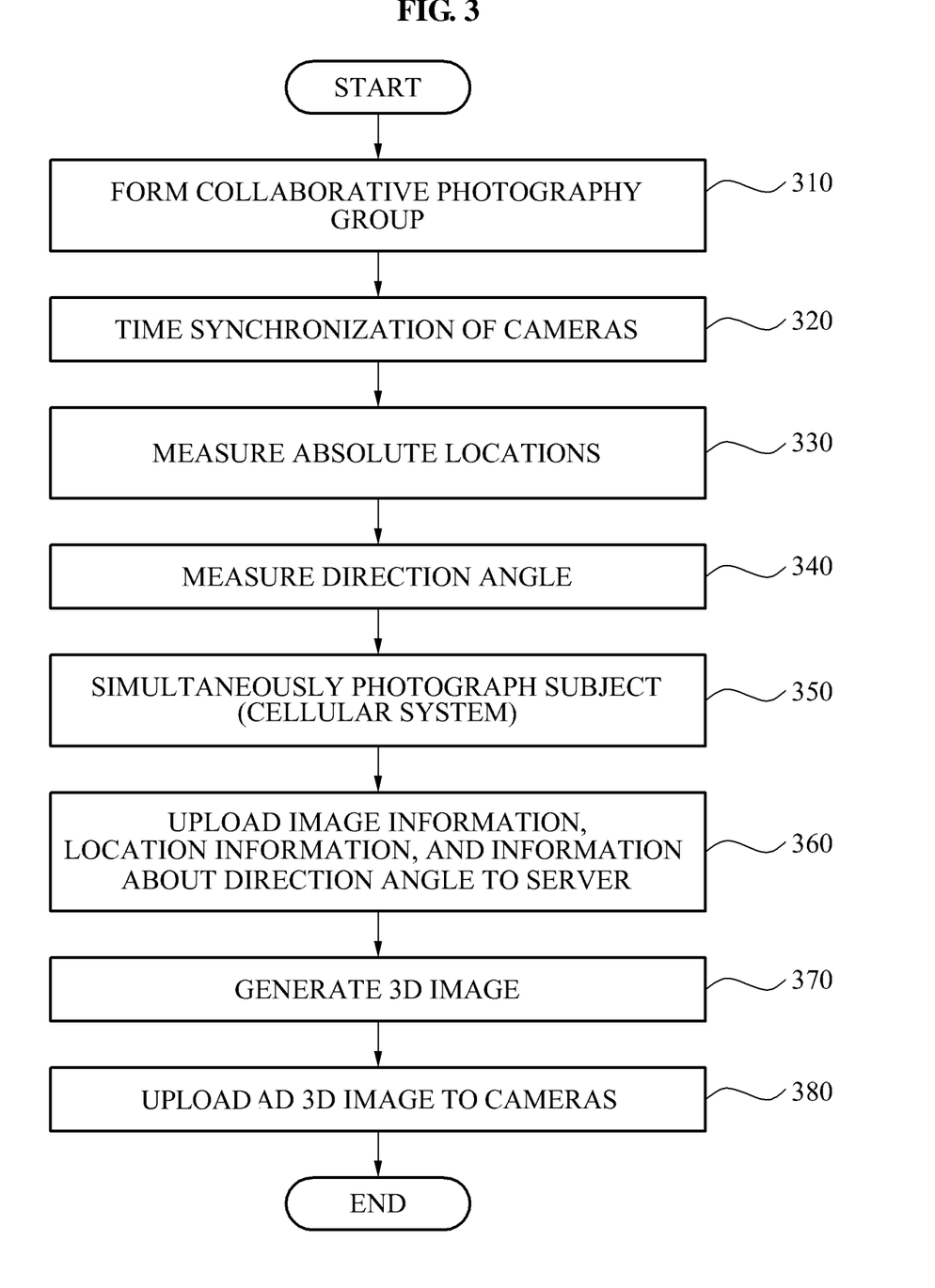
FIG. 3 is a flowchart illustrating an example of a method of a mobile telecommunications operator, a plurality of cameras, and a server.

FIG. 3 illustrates an example of a method of a mobile telecommunications operator, a plurality of cameras, and a server.

Referring to FIG. 3, in operation 310, the mobile telecommunications operator forms a collaborative photography group including a plurality of cameras. For example, a user may previously subscribe to a service that is provided by the mobile telecommunications operator, through a webpage of the mobile telecommunications operator, and the like. Thus, when the plurality of cameras are located in a predetermined area, the cameras may be included in a collaborative photography group by the mobile telecommunications operator.

In operation 320, the cameras synchronize times using a network of a cellular communication system for synchronization of photographing times.

In operation 330, when the cameras do not configure an ad hoc network between the cameras. Accordingly, the cameras may not be able to measure relative locations of the other cameras. Thus, the cameras may measure absolute locations, for example, using a GPS.

In operation 340, the cameras measure a direction angle of the object using an accelerometer installed in each of the cameras.

In operation 350, the cameras simultaneously photograph the object at the synchronized photographing time.

In operation 360, when image information is obtained by simultaneously photographing the object, each of the cameras uploads the image information to a predetermined server. Also, location information and direction angle information of each of the cameras may be uploaded to the server. For example, the server may be operated by the mobile telecommunications operator, and connected to the Internet or the network of the cellular communication system.

In operation 370, the server generates a 3D image by processing (3D rendering) the image information of the cameras. That is, the server may generate the 3D image by processing the image information of all the cameras based on the location information and the direction angle information of the cameras.

In operation 380, the server may upload the generated 3D image to the cameras. Accordingly, the cameras may obtain the 3D image without performing 3D rendering.

Figure 4:
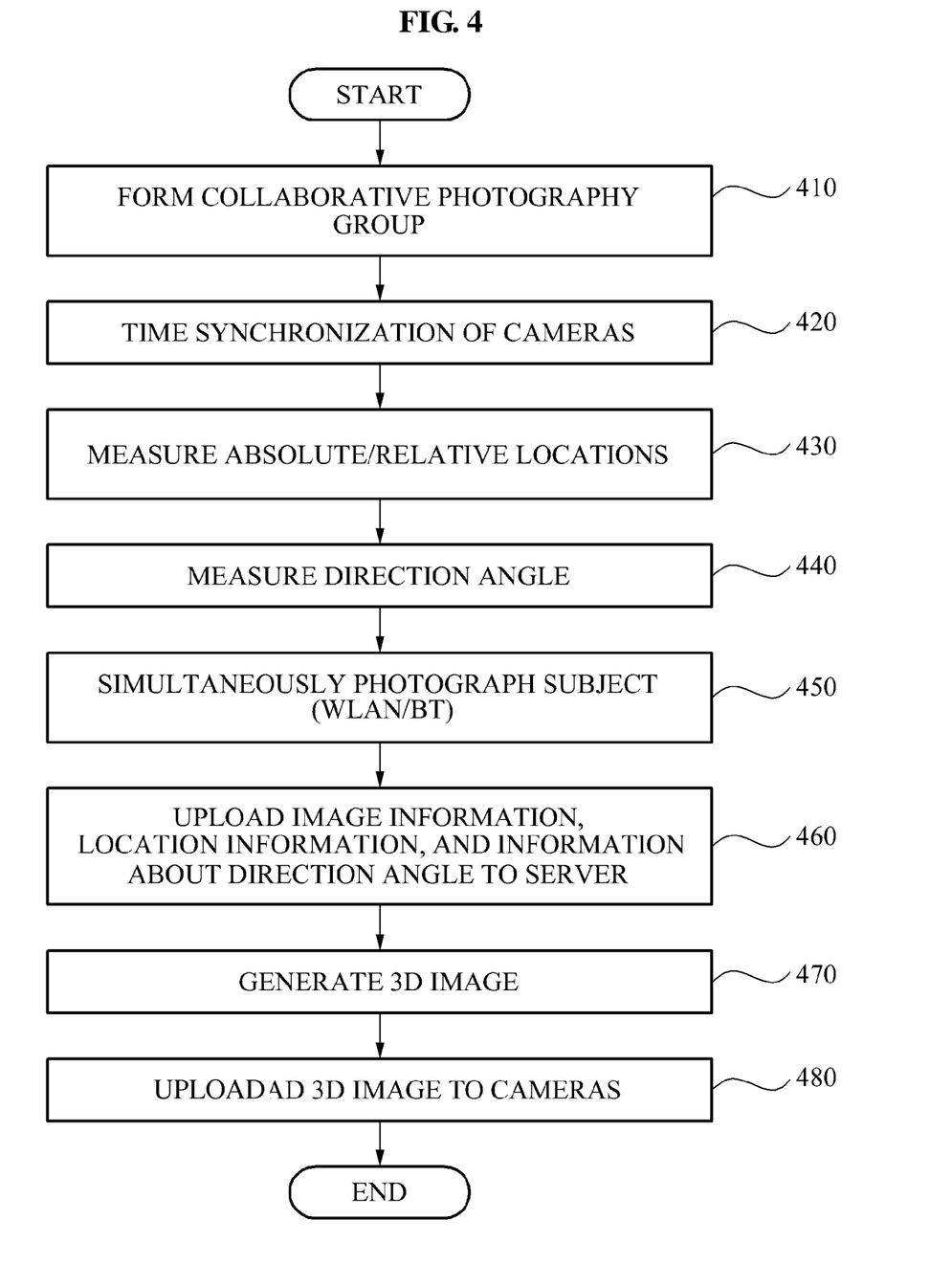
FIG. 4 is a flowchart illustrating an example of a plurality of cameras and a server.

FIG. 4 illustrates an example method of a plurality of cameras and a server. In this example, the cameras configure an ad hoc network between the cameras and 3D rendering is performed by a server.

Referring to FIG. 4, in operation 410, the plurality of cameras form a collaborative photography group.

In operation 420, the plurality of cameras synchronize times through an ad hoc network, for example, a Wireless Local Area Network (WLAN), Bluetooth, and the like. In operation 430, the plurality of cameras measure relative or absolute locations of the cameras. In operation 440, the plurality of cameras measure a direction angle of the object using an accelerometer.

In operation 450, the cameras simultaneously photograph the object at the synchronized photographing time.

In operation 460, the cameras upload obtained image information, location information, and direction angle information to the server. In operation 470, the server generates a 3D image by processing (3D rendering) the image information of the cameras. In operation 480, the server uploads the 3D image to the plurality of cameras.

Figure 5:
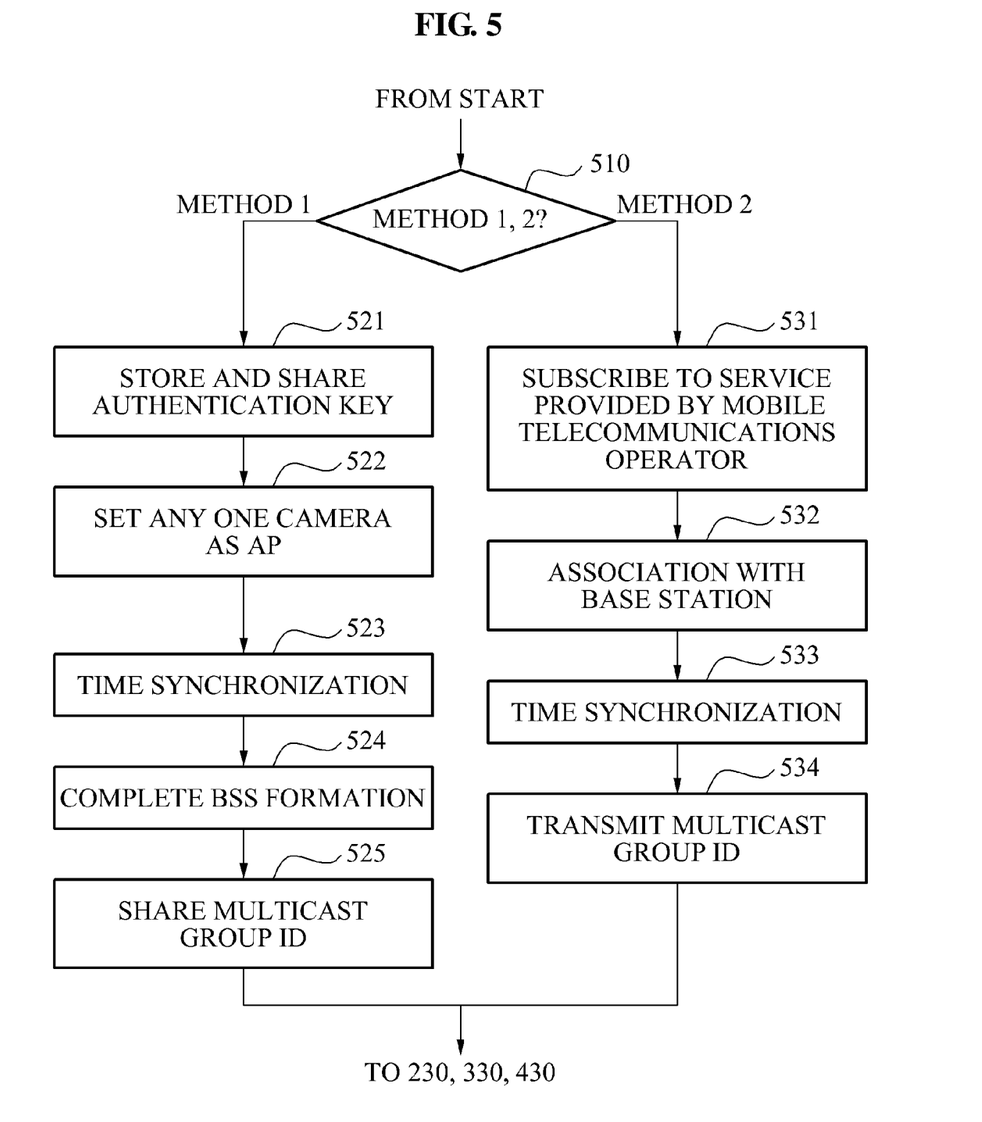
FIG. 5 is a flowchart illustrating an example of a method for synchronizing a plurality of cameras.

FIG. 5 illustrates an example of two methods for synchronizing photographing time. The methods may be used in the example methods illustrated in FIG. 2, FIG. 3, and FIG. 4. For example, operations 220, 320, and 420, may be performed by either of the methods illustrated in FIG. 5.

Referring to FIG. 5, the method for synchronizing photographing time includes two examples, a method 1 and a method 2, as described below. Any one of the method 1 and the method 2 may be selectively used.

In operation 510, method 1 may be selected. In operation 521, cameras may store and share an authentication key in advance. In operation 522, when the cameras having the authentication key enter a predetermined area, any one of the cameras may be set as an access point (AP). For example, a camera having the greatest coverage may be set as the AP. After the AP is set, the cameras may be associated with and authenticated by the AP. For the association, the cameras are synchronized with the AP.

Accordingly, in operation 523, time synchronization of the cameras may be performed through the association. When the authentication is completed, in operation 524, a network such as a Basic Service Set (BSS) may be formed. In operation 525, the AP may generate a multicast group identifier (ID) and share the multicast group ID with the cameras to enable the cameras, included in the collaborative photography group, to use a multicast scheme.

Alternatively, in operation 510, method 2 may be selected. In operation 531, a plurality of cameras may subscribe to a predetermined service that is provided by a mobile telecommunications operator, to form a collaborative photography group. In operation 532, when the cameras subscribed to the service enter a predetermined area, the cameras may be associated with a base station for authentication. In operation 533, time synchronization may be performed with respect to the cameras. In operation 534, the base station of a cellular communication system may transmit a single multicast group ID to the cameras with respect to each of the cameras.

Accordingly, photographing times of the cameras may be synchronized using either method 1 or method 2.

Figure 6:
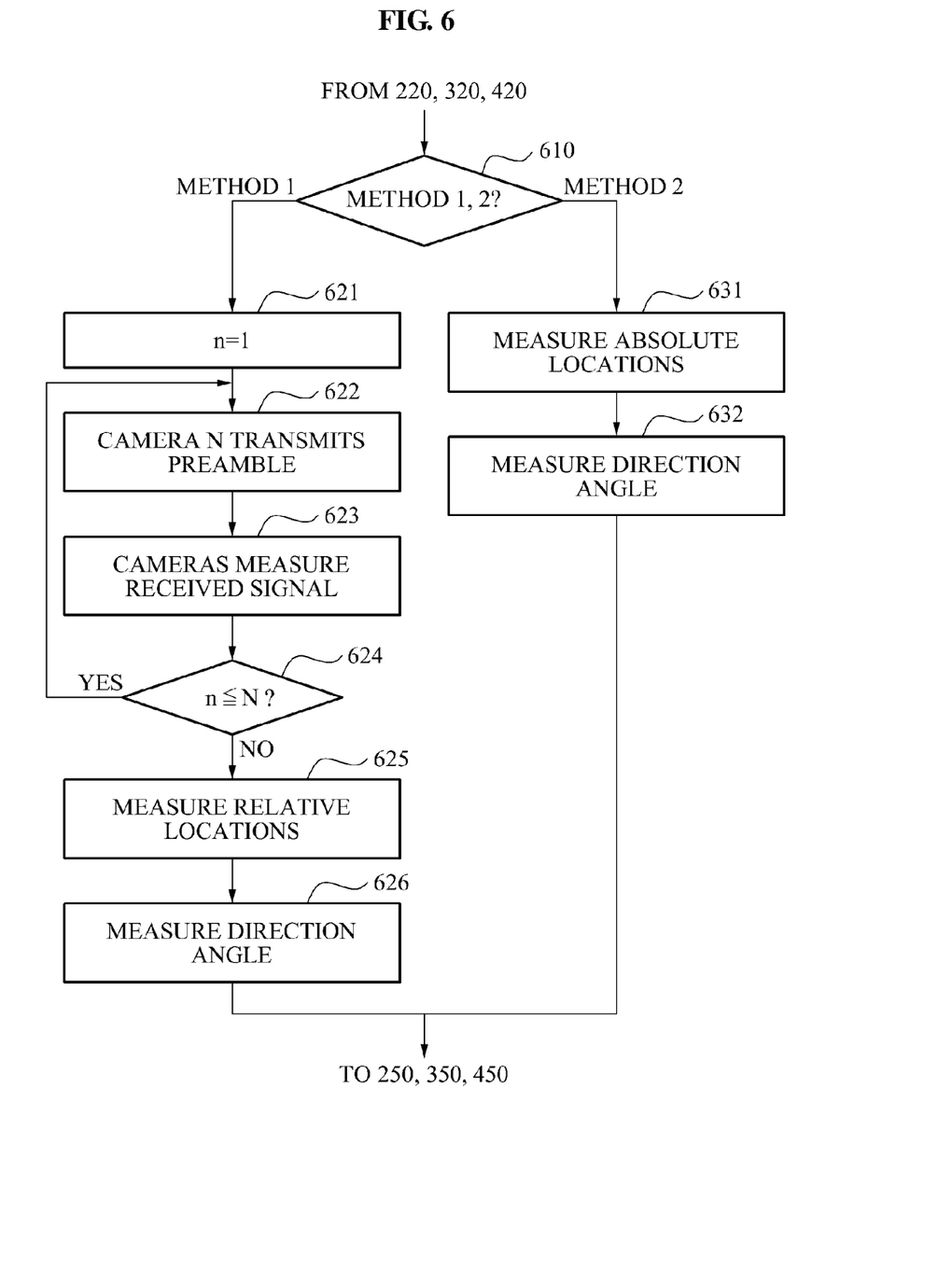
FIG. 6 is a flowchart illustrating an example of a method for measuring absolute/relative locations and measuring direction angle.

FIG. 6 illustrates an example of two methods for measuring absolute/relative locations and measuring direction angle. The methods may be used in the example methods illustrated in FIG. 2, FIG. 3, and FIG. 4. For example, operations 230 and 240, 330 and 340, and 430 and 440, may be performed by either of the methods illustrated in FIG. 6.

Absolute or relative locations of the cameras may be measured using various methods. FIG. 6 illustrates two example measurement methods, method 1 and method 2. The example method 1 uses an ad hoc network and the example method 2 uses a GPS.

Referring to FIG. 6, method 1 may be selected in operation 610. In operation 621, an index n of the cameras may be set as "1".

In operation 622, an $n^{th}$ camera, hereinafter referred to as camera n, may transmit a preamble. In this example, all cameras may sequentially transmit preambles.

In operation 623, other cameras may receive the preamble that is transmitted by the camera n, and measure the received signal. For example, an intensity of the received signal may be measured.

In operation 624, it may be determined whether all the cameras have transmitted the preamble. When all N cameras do not transmit the preamble, for example, another camera such as camera n+1 may transmit the preamble. Conversely, when the N cameras transmit the preamble, the cameras may measure relative locations based on the received signal in operation 625. As described above, a DOA of the preamble that is received may be used to estimate the relative locations of the cameras.

In operation 626, each of the cameras may measure a direction angle of the object using an accelerometer.

Alternatively, when method 2 is selected in operation 610, each of the cameras may measure absolute locations using a GPS in operation 631. In operation 632, each of the cameras may measure the direction angle of the object using the accelerometer.

Figure 7:
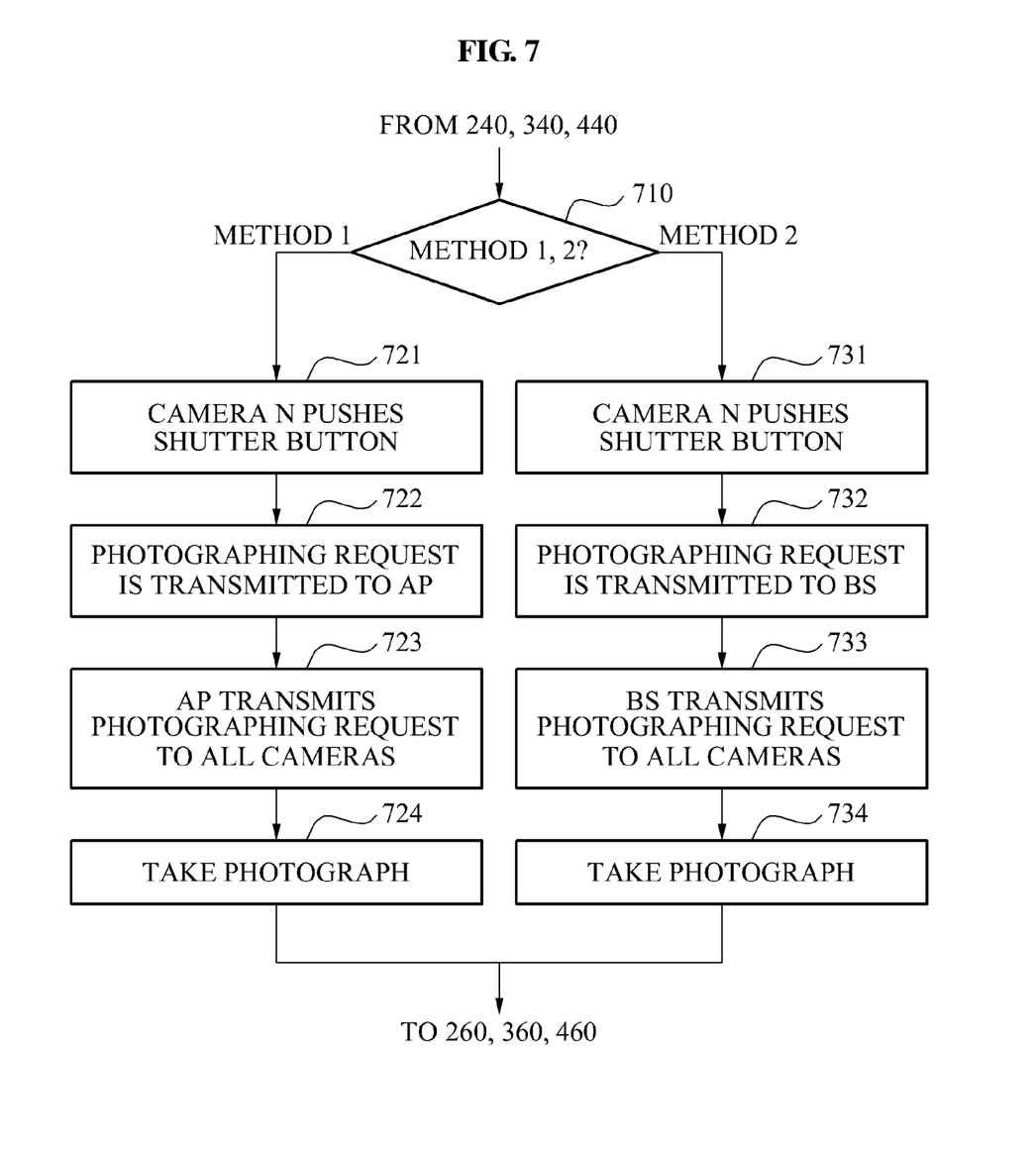
FIG. 7 is a flowchart illustrating an example of a method of simultaneously photographing an object.

FIG. 7 illustrates a an example of two methods for simultaneously photographing an object. The methods may be used in the example methods illustrated in FIG. 2, FIG. 3, and FIG. 4. For example, operation 250, 350, and 450, may be performed by either of the methods illustrated in FIG. 7.

A plurality of cameras may simultaneously photograph in various ways. According to various embodiments, the two methods illustrated in FIG. 7, method 1 and method 2, may be used. However, these methods are merely for purposes of example, and it should be understood that the method of simultaneously photographing may vary.

Referring to FIG. 7, method 1 may be used in operation 710. In operation 721, a terminal, that is, a camera n from among a plurality of cameras, may have a shutter button pushed. In operation 722, a photographing request of the camera n may be transmitted to an AP. In operation 723, the AP may forward the photographing request to each of the cameras included in the plurality of cameras. For example, the AP may be any one of the plurality of cameras. In operation 724, each the cameras including the camera n, may simultaneously photograph an object when a photographing request is received or at a time corresponding to the photographing request.

Alternatively, when method 2 is selected in operation 710, a camera n from among the plurality of cameras may have a shutter button pushed in operation 731. In operation 732, a photographing request of the camera n may be transmitted to a base station of a cellular communication system. In operation 733, the base station may forward the photographing request to all the cameras, for example, using a Short Message Service (SMS) scheme, a multicast scheme, and the like. In operation 734, each the cameras including the camera n may simultaneously photograph an object when the photographing request is received or at a time corresponding to the photographing request.

Figure 8:
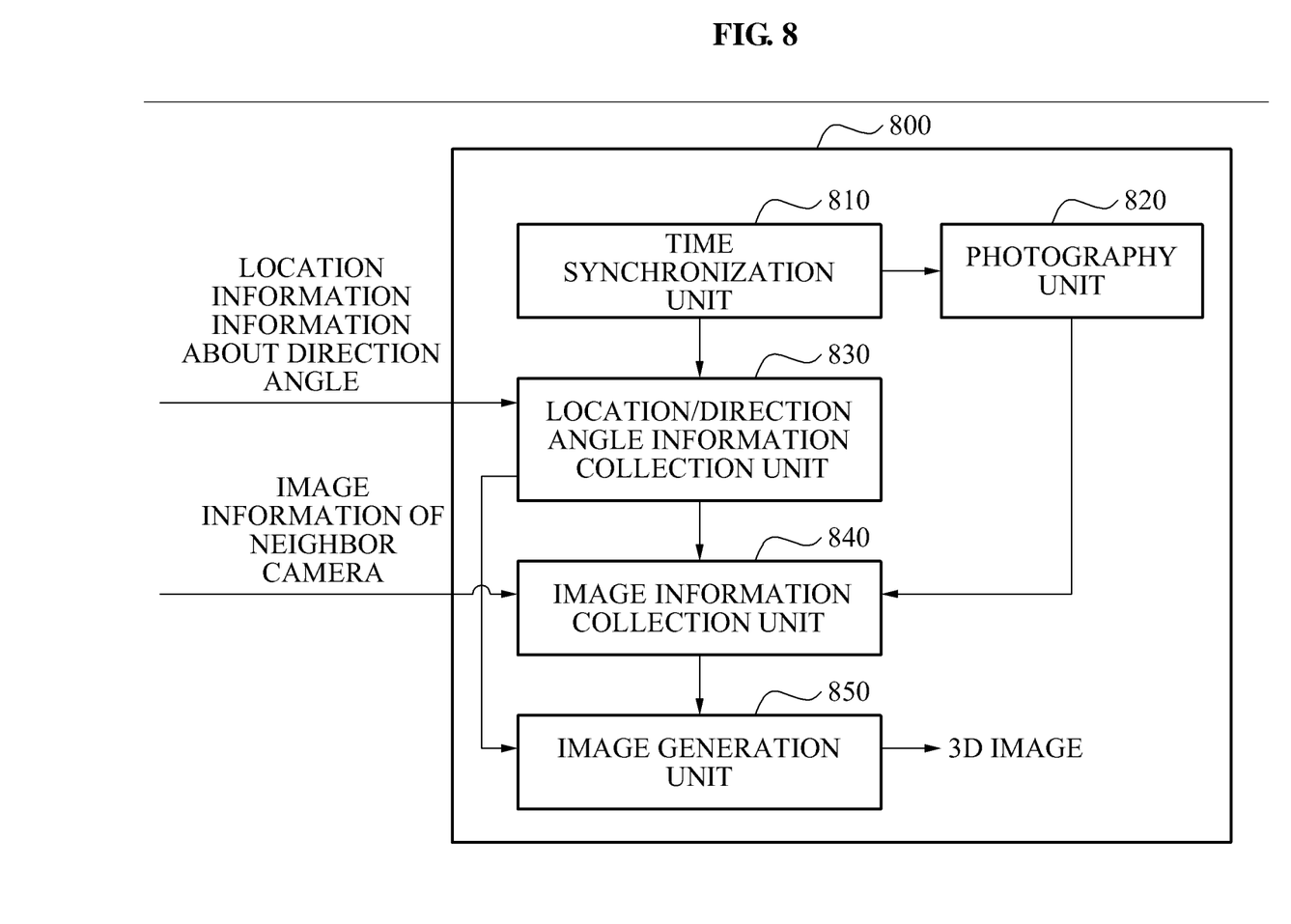
FIG. 8 is a block diagram illustrating an example of a camera.

FIG. 8 illustrates an example of a camera.

Referring to FIG. 8, camera 800 may include a photographing time synchronization unit 810, a photography unit 820, a location/direction angle information collection unit 830, an image information collection unit 840, and an image generation unit 850.

The time synchronization unit 810 synchronizes the internal time of cameras for synchronizing photographing times of one or more neighboring cameras and the camera 800. In this example, the one or more neighboring cameras and the camera 800 may be included in a previously formed collaborative photography group.

The photography unit 820 and the one or more neighboring cameras may simultaneously photograph an object at a synchronized photographing time.

The location/direction angle information collection unit 830 may collect direction angle information and location information of the one or more neighboring cameras and/or direction angle information and location information of the camera 800.

The image information collection unit 840 may collect image information of the one or more neighboring cameras.

The image generation unit 850 may process the image information of the one or more neighboring cameras and the camera 800, based on the direction angle information and the location information of the one or more neighboring cameras and the camera 800. For example, the image generation unit 850 may perform 3D rendering based on locations and direction angles of the cameras, and may generate a 3D image of the object.

Accordingly, 3D rendering may be performed based on the locations and direction angles of the cameras and a 3D video and/or a 3D image may be generated.

As a non-exhaustive illustration only, the terminal device described herein may refer to mobile devices such as a cellular phone, a personal digital assistant (PDA), a digital camera, a portable game console, an MP3 player, a portable/personal multimedia player (PMP), a handheld e-book, a portable laptop and/or tablet personal computer (PC), a global positioning system (GPS) navigation, and devices such as a desktop PC, a high definition television (HDTV), an optical disc player, a setup box, and the like, capable of wireless communication or network communication consistent with that disclosed herein.

A computing system or a computer may include a microprocessor that is electrically connected with a bus, a user interface, and a memory controller. It may further include a flash memory device. The flash memory device may store N-bit data via the memory controller. The N-bit data is processed or will be processed by the microprocessor and N may be 1 or an integer greater than 1. Where the computing system or computer is a mobile apparatus, a battery may be additionally provided to supply operation voltage of the computing system or computer.

It should be apparent to those of ordinary skill in the art that the computing system or computer may further include an application chipset, a camera image processor (CIS), a mobile Dynamic Random Access Memory (DRAM), and the like. The memory controller and the flash memory device may constitute a solid state drive/disk (SSD) that uses a non-volatile memory to store data.

The processes, functions, methods and/or software described above may be recorded, stored, or fixed in one or more computer-readable storage media that includes program instructions to be implemented by a computer to cause a processor to execute or perform the program instructions. The media may also include, alone or in combination with the program instructions, data files, data structures, and the like. The media and program instructions may be those specially designed and constructed, or they may be of the kind well-known and available to those having skill in the computer software arts. Examples of computer-readable media include magnetic media, such as hard disks, floppy disks, and magnetic tape; optical media such as CD-ROM disks and DVDs; magneto-optical media, such as optical disks; and hardware devices that are specially configured to store and perform program instructions, such as read-only memory (ROM), random access memory (RAM), flash memory, and the like. Examples of program instructions include machine code, such as produced by a compiler, and files containing higher level code that may be executed by the computer using an interpreter. The described hardware devices may be configured to act as one or more software modules in order to perform the operations and methods described above, or vice versa. In addition, a computer-readable storage medium may be distributed among computer systems connected through a network and computer-readable codes or program instructions may be stored and executed in a decentralized manner.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A method executed by a single camera connected to a communication network, the method comprising:
    synchronizing, by the single camera, time for the single camera and a neighbor camera that are each included in a previously formed collaborative photography group, so as to synchronize a photographing time of the neighbor camera and the single camera;
    collecting, by the single camera, direction angle information and location information about the neighbor camera;
    collecting, by the single camera, image information, from the single and neighbor cameras, of an object that is photographed by the single and neighbor cameras at the synchronized photographing time; and
    generating, by the single camera, a three-dimensional (3D) image of the object based on the collected image information, direction angle information, and location information.

2. The method of claim 1, further comprising synchronizing, by the single camera, time of the single camera and an access point of the collaborative photography group, so as to synchronize time of the neighbor camera and the single camera.

3. The method of claim 1, further comprising photographing, by the single camera, the object at the synchronized photographing time to generate image information of the single camera.

4. The method of claim 3, wherein the 3-D image of the object is generated based additionally on direction angle information and location information of the single camera.

5. The method of claim 1, wherein the direction angle information and the location information are collected using an ad hoc network.

6. The method of claim 1, wherein the location information is estimated based on a signal received from the neighbor camera.

7. The method of claim 1, wherein the direction angle information is produced by an accelerometer and a geomagnetic sensor that are installed in the neighbor camera.

8. The method of claim 1, wherein the collected image information is network-coded.

9. The method of claim 2, wherein the access point comprises any one of a plurality of cameras included in the collaborative photography group, or a base station of a cellular system.

10. The method of claim 1, further comprising receiving, by the single camera, a multicast group identifier (ID) of the collaborative photography group for a multicast scheme used to collect at least one of the location information, the direction angle information, and the image information.

11. A method of a single camera connected to a communication network, the method comprising:
    synchronizing, by the single camera, time for the single camera a neighbor camera that are included in a previously formed collaborative photography group, so as to synchronize a photographing time of the neighbor camera and the single camera;
    collecting, by the single camera, direction angle information and location information of the single camera;
    photographing, by the single camera, a subject at the synchronized photographing time;
    generating image information of the single camera;
    uploading, by the single camera, the image information, the location information, and the direction angle information of the single camera to a predetermined server; and
    receiving, by the single camera, a three-dimensional (3D) image of the subject from the predetermined server.

12. A non-transitory computer-readable storage medium having stored therein program instructions to cause a processor to implement a method executed by a single camera connected to a communication network, the method comprising:
    synchronizing, by the single camera, time of the single camera and a neighbor camera, so as to synchronize a photographing time of the neighbor camera and the single camera;

collecting, by the single camera, direction angle information and location information of the neighbor camera;

collecting, by the single camera, image information, from the single and neighbor cameras, of an object that is photographed by the single and neighbor cameras at the synchronized photographing time; and generating, by the single camera, a three-dimensional (3-D) image of the object based on the collected image information, direction angle information, and location information.

13. A single camera connected to a communication network, the single camera comprising:

a time synchronization unit configured to synchronize time of the single camera and a neighbor camera, so as to synchronize a photographing time of the neighbor camera and the single camera;

a location/direction angle information collection unit configured to collect direction angle information and location information of the neighbor camera;

an image information collection unit configured to collect image information, from the single and neighbor cameras, of an object photographed by the single and neighbor cameras at the synchronized photographing time; and an image generation unit configured to generate a three-dimensional (3-D) image of the object based on the collected image information, direction angle information, and location information.

14. The single camera of claim 13, further comprising a photography unit configured to photograph the object at the synchronized photographing time to generate image information of the single camera.

15. The method of claim 1 further comprising:

establishing, by the single camera, the single camera as an access point;

authenticating, by the single camera, the neighbor camera as a member of a group, which includes the single camera, using an authentication key shared by the single and neighbor cameras;

generating, by the single camera, upon completing the authentication, a multicast group identifier (ID) for the group and sharing the multicast group ID with the neighbor camera, wherein the image information is collected from the neighbor camera using a multicast scheme identifying the group by the multicast group ID.

16. The medium of claim 12, wherein the method further comprises:

establishing, by the single camera, the single camera as an access point;

authenticating, by the single camera, the neighbor camera as a member of a group, which includes the single camera, using an authentication key shared by the single and neighbor cameras;

generating, by the single camera, upon completing the authentication, a multicast group identifier (ID) for the group and sharing the multicast group ID with the neighbor camera, wherein the image information is collected from the neighbor camera using a multicast scheme identifying the group by the multicast group ID.

17. The single camera of claim 13, wherein:

the single camera establishes itself as an access point;

the single camera authenticates the neighbor camera as a member of a group, which includes the single camera, using an authentication key shared by the single and neighbor cameras;

the single camera, upon completing the authentication, generates a multicast group identifier (ID) for the group and shares the multicast group ID with the neighbor camera, wherein the image information is collected from the neighbor camera using a multicast scheme identifying the group by the multicast group ID.

* * * * *